May 9, 1939.  D. MILAN  2,157,938
DRYING OVEN
Original Filed March 5, 1937  3 Sheets-Sheet 1
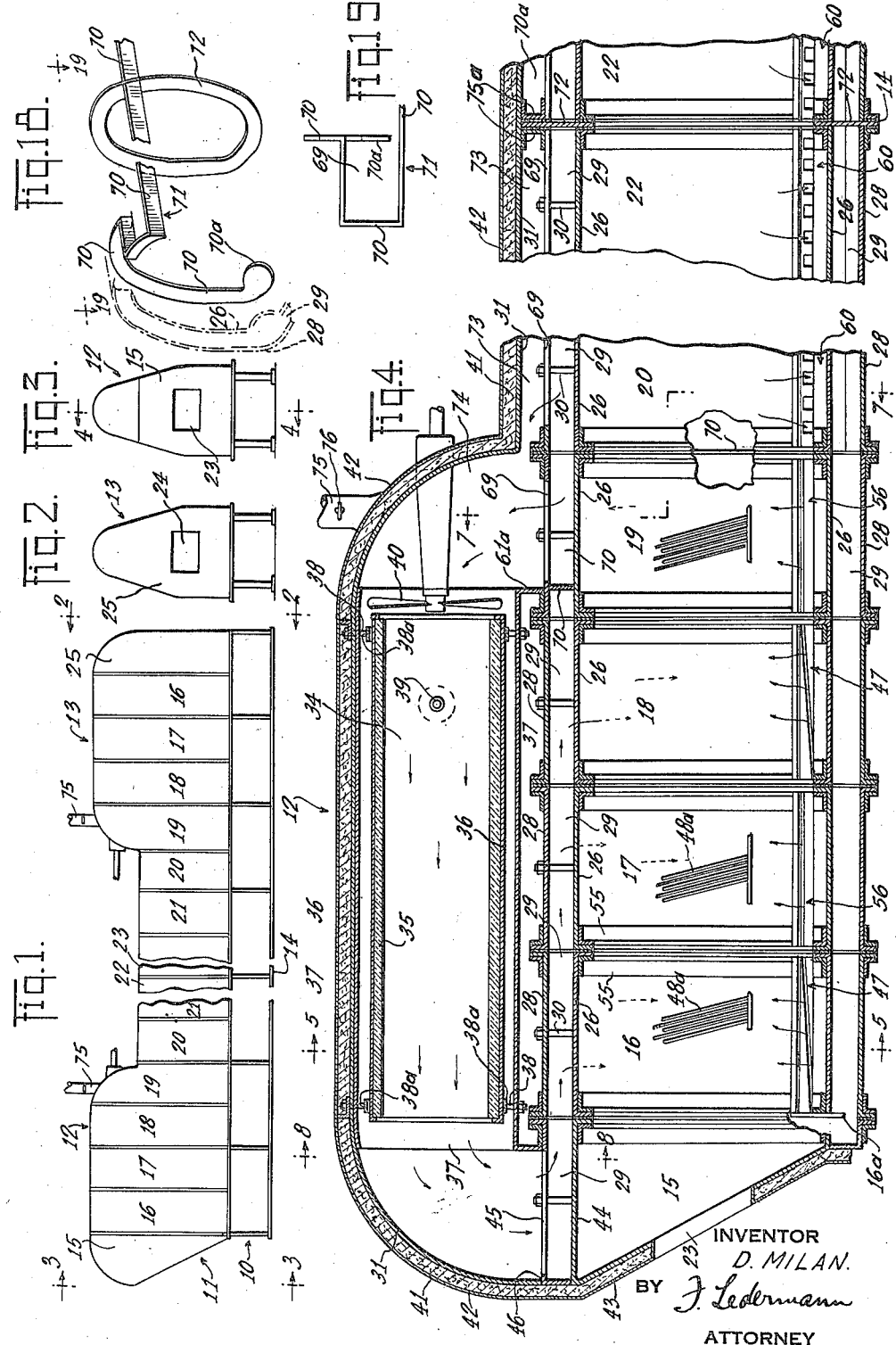
INVENTOR
D. MILAN.
BY F. Ledermann
ATTORNEY

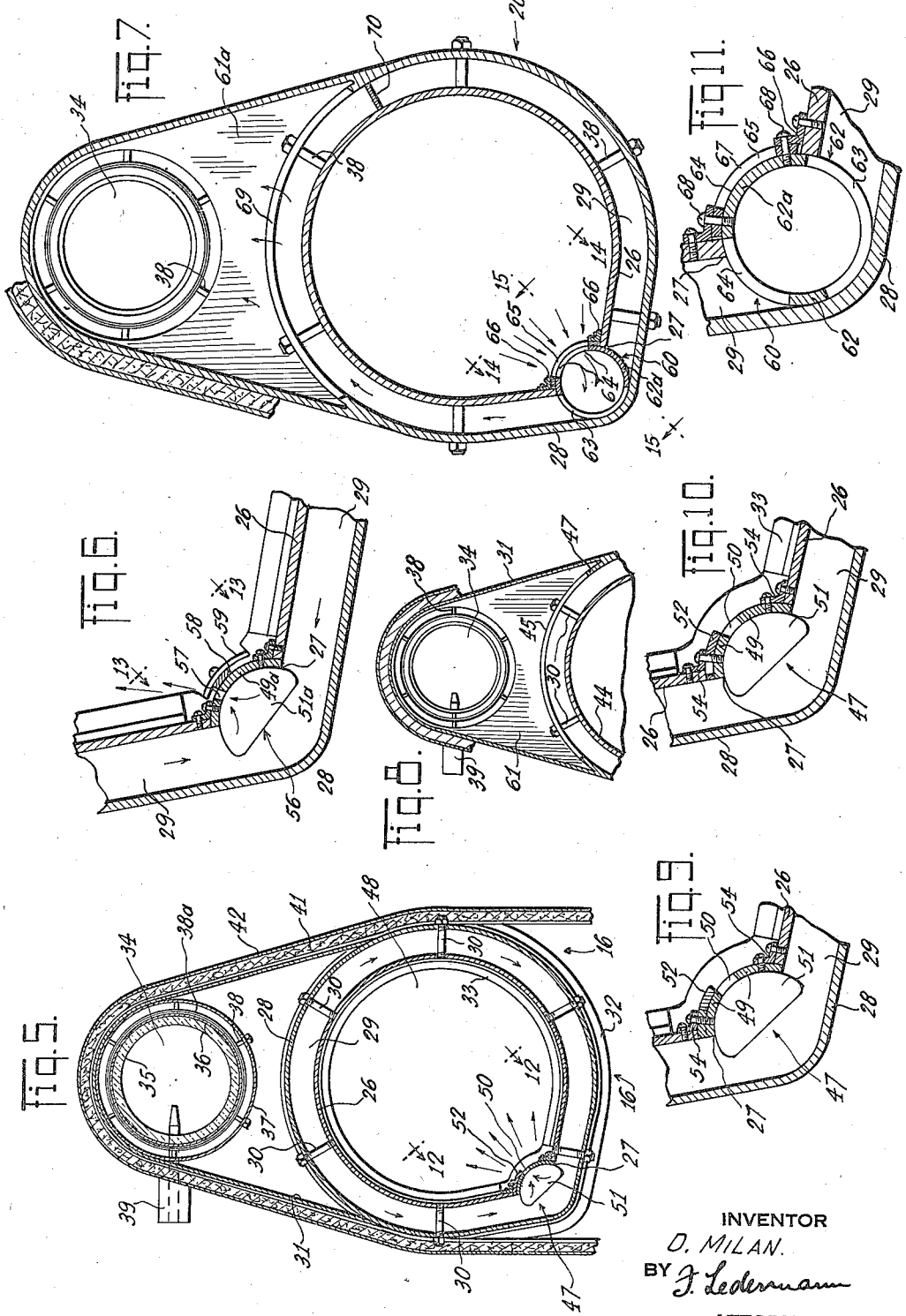

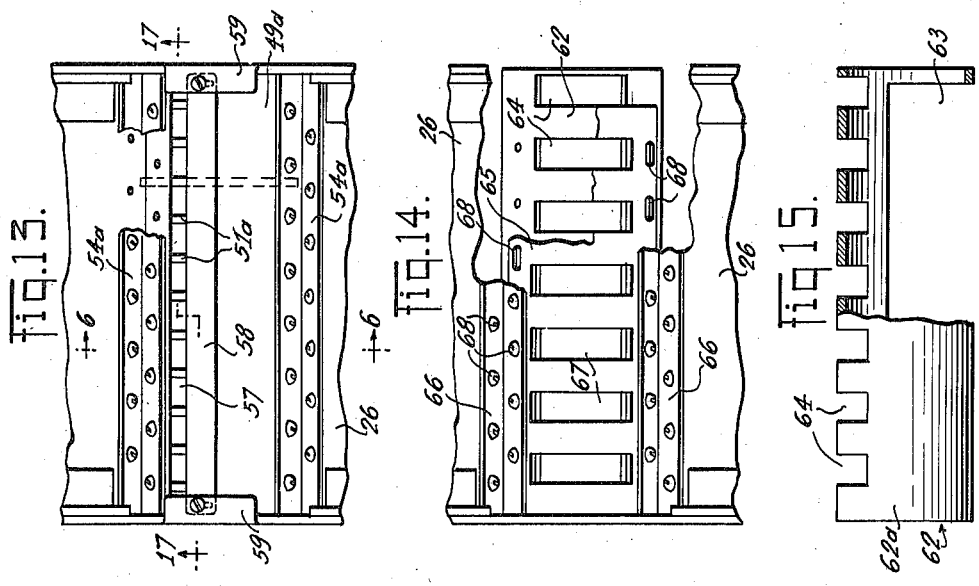
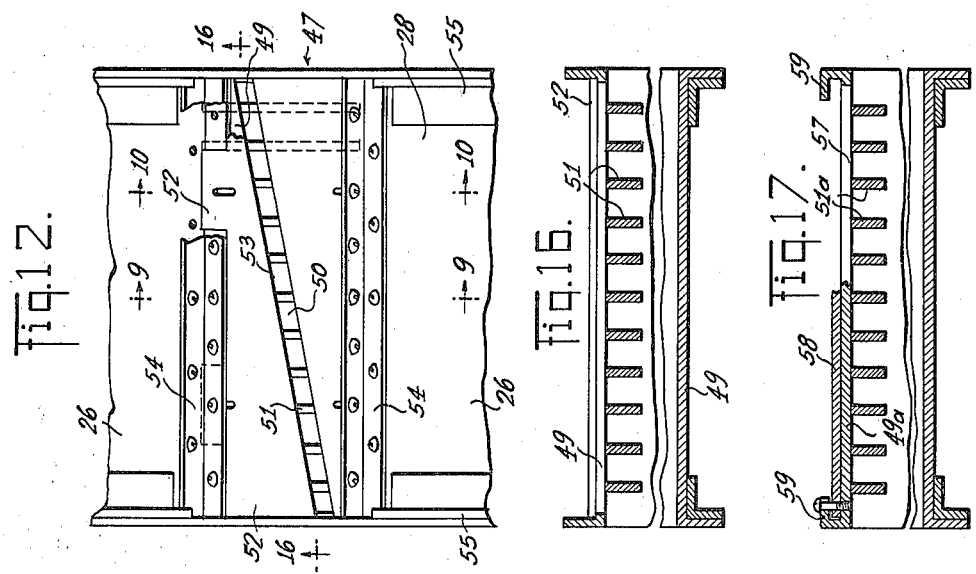

Patented May 9, 1939

2,157,938

UNITED STATES PATENT OFFICE 2,157,938

DRYING OVEN

Daniel Milan, New Orleans, La.

Application March 5, 1937, Serial No. 129,138
Renewed October 26, 1938

5 Claims. (Cl. 34—19)

This invention relates to ovens used for the purpose of drying paint, enamel, lacquer, and the like, on sheet metals such as tin, iron, or any other metals that require oven drying. This type of oven dries by utilizing circulating heated air. Such ovens are mounted on a relatively long structural iron or steel base, and are formed of a plurality of segments joined together so as to provide a continuous oven opening or passage from one end to the other. At each end of the oven, means are provided above the oven for heating air by a gas or oil burner, each such burner being further provided with a fan which serves to blow the heated air through a combustion chamber in which the inlet air is heated and then discharged by the same fan pressure into the oven at each end through a series of dampers that serve to keep the heated air thoroughly mixed so that an approximately uniform temperature may be maintained throughout the oven.

Another object of this invention is the provision of dampers of novel construction and so situated with respect to the oven and to each other, as to more thoroughly mix the heated air within the oven and to more efficiently utilize the heat blown into the oven from the combustion chamber.

Another object of the invention is the provision of further modifications and improvements in the construction and arrangement of various parts of the oven and combustion chamber to enhance its efficiency and economy of operation.

The above and other objects will become apparent in the description below, in which characters of reference refer to like-named parts in the accompanying drawings.

Referring briefly to the drawings, Figure 1 is a side elevational view of the oven.

Figure 2 is an end view taken on the line 2—2 of Figure 1.

Figure 3 is an end view taken on the line 3—3 of Figure 1.

Figure 4 is a fragmentary longitudinal cross-sectional view taken on the line 4—4 of Figure 2.

Figure 5 is a cross-sectional view taken on the line 5—5 of Figure 4.

Figure 6 is a cross-sectional view taken on the line 6—6 of Figure 13.

Figure 7 is a cross-sectional view taken on the line 7—7 of Figure 4.

Figure 8 is a cross-sectional view taken on the line 8—8 of Figure 4.

Figure 9 is a cross-sectional view taken on the line 9—9 of Figure 12.

Figure 10 is a cross-sectional view taken on the line 10—10 of Figure 12.

Figure 11 is a cross-sectional view of the outlet damper alone taken on the line 7—7 of Figure 4, showing this damper in a different position from that shown in Figure 7.

Figure 12 is a view taken on the line 12—12 of Figure 5.

Figure 13 is a view taken on the line 13—13 of Figure 6.

Figure 14 is a view taken on the line 14—14 of Figure 7.

Figure 15 is a fragmentary view of the outlet damper cylinder, partly in section, taken on the line 15—15 of Figure 7.

Figure 16 is a cross-sectional view taken on the line 16—16 of Figure 12.

Figure 17 is a cross-sectional view taken on the line 17—17 of Figure 13.

Figure 18 is a fragmentary perspective view of the baffle separating, in conjunction with the outlet dampers, the incoming from the outgoing hot air.

Figure 19 is a view taken on the line 19—19 of Figure 18.

Referring in detail to the drawings, the numeral 10 indicates an elongated structural iron standard or upright support on which the oven indicated generally at 11, is mounted in elevated position with respect to the floor. The oven comprises a pair of end sections 12 and 13 which are alike in every respect from their outer ends to their inner ends 14, at which they are joined. Each section 12 or 13 is formed of a plurality of segments 16, 17, 18, 19, 20, 21, and so on to 22, the latter numeral indicating the innermost segment of each end 12 and 13, the number of additional segments on each end 12 and 13 between the segments 21 and 22 being a matter of choice and variable. The inlet segment 15 into which the metal sheets are fed through the opening 23, differs slightly in form, as shown from the rearmost section 24 out of which the finished sheets are delivered through the outlet opening 25.

Each segment 16–22 above-mentioned comprises a substantially cylindrical inner shell 26 having an opening 27 at its lower left-hand corner extending through the full depth of the segment. An outer shell 28 surrounds the shell 26 concentrically at a spaced-apart distance therefrom, to provide a peripheral and co-axial compartment or channel 29 between the two shells. Bolts 30 secure the shells together, and some of these bolts also secure the segments to the inner wall 31 of the oven housing. The segments are provided with webs or flanges 32 and 33 on their edges, by means of which they are locked together end-to-end by the arcuate angle irons 55 with a heat insulating material therebetween, to form the cylindrical oven with its continuous opening 48 extending from the entrance 23 to the outlet 25.

At either end of the oven, a combustion chamber 34 is mounted above the segments at that end. This chamber is enclosed by a fire tile lining 35 contained within a metal cylinder 36. A second cylinder 37 surrounds the cylinder 36 at a spaced-apart distance therefrom and is united thereto by means of bolts 38 and rings 38a to permit free expansion and contraction of the combustion chamber housing. This housing is open at both ends. An apron 61 supported on the shell 46 of the segment 15, closes the space between the cylinder 37 and the shell 46 at that end, and a similar apron 61a closes this space at the other end of the cylinder 37. Near the inner end thereof, a burner 39 is mounted, and in the innermost end a fan or blower 40 is provided. The inner shell of the entire oven housing indicated at 31, is covered with a heat insulating material 41, and an outer shell 42 surrounds the lining 41. This housing 31, 41, 42, surrounds the entire oven.

The front segment 15 is formed similarly to the segments 16—22, with the exception that the inclined door wall 43 cuts off the forward and lower portion of this segment. The inner oven shell 44 is continuous around the sides and top of the segment 15, but an opening 45 is provided in the top of its outer shell 46. Hence, when the fan 40 blows the air which has been heated by the burner 39 out of the front end of the combustion chamber 34, this air passes down through the opening 45 and into the annular passage 29 between the inner and outer shells 26 and 28, respectively, of the cylindrical oven. This heated air entering the annular passage 29 passes both rearward along this channel and downward around both sides of the segments 15, 16, 17, and 18. In the lower left-hand corner of the segment 16, shown in Figure 5, an inlet damper 47 whose front end (left end, Figure 4) is closed by a web or disc 16a, is mounted in the opening 27. This damper is shown also in Figure 12. It comprises a semi-cylindrical housing 49 having its convex surface facing the interior 48 of the oven. This cylindrical surface 49 is cut through by a transverse opening or slot 50 interspersed with a series of semi-disc grill blades 51 between which free passage is provided from one side of the annular channel 29 and the oven chamber 48. A shutter 52 whose edge 53 is cut at the same angle as the opening 50, is mounted on the housing 49 and may be moved on the axis of the cylinder to vary the degree of the opening 50. As a result of the angular cut of the opening 50, the heated air passing into the interior 48 of the segment 16 through the damper 47 (from the passage 29) will be spread fanwise or spirally into the interior 48 in that segment. This will result in a thorough spreading and mixing of the heated air in that segment. The housing 49 is suspended in the opening 27 by means of the angle irons 54 along each side of this opening. It is to be noted that the entire damper 47 may readily be removed from the opening 27. An identical inlet damper 47 is mounted in the opening 27 of each segment 18.

In each of the openings 27 of the segments 17 and 19, a modified type of inlet damper, indicated at 56 and shown in Figure 13, is mounted in the same manner as the damper 47. The damper 56 is substantially identical with the damper 47, with the exception that its slot 57 extends straight along the semi-cylindrical housing 49a thereof instead of spirally, that is, the slot 57 is parallel with the axis of the housing 49a, and it is furthermore situated close along the upper edge of its housing. Arcuate ears 59 extend from the ends of the housing 49a and overlap the ends of the housing. These ears have suspended therefrom a shutter 58, whose operation by sliding up or down (concentrically) to reduce or increase the passage 57 through the grill semi-discs 51a, is obvious. In all respects in which the damper 56 is identical to the damper 47, the same reference numerals have been used with an "a" added. It is obvious that, because of the position and the straight-line form of the slot 57, hot air passing therethrough from the annular channel 29 will take the path of a sheet upward along the left-hand wall of the oven chamber 48 and then arcuately to follow the curved wall 26. Continued blowing of the hot air through the damper 56, will, therefore, cause a thorough mixing in a spiral movement, within the segments 17 and 19.

As above stated, segments 16 and 18 are provided with the spiral-slotted inlet dampers 47, and segments 17 and 19 with the straight-slotted inlet dampers 56. The intervening segments on each end 12 and 13, between the straight damper 56 in segment 19 and the innermost segment 2, are all provided in their openings 27 with outlet dampers 60 about to be described below.

The outlet damper 60 comprises essentially a cylindrical housing 62 having a rectangular portion thereof cut out to provide the opening or cut-out 63 extending practically from end to end, the arcuate length of this cut-out extending through slightly less than a half-circle. At approximately the diametrically opposite position, a series of transverse slots 64 are cut through the housing 62. An axially slidable shutter, also provided with slots 67 similar to the slots 64, is mounted between the angle irons 66 by means of which the housing 63 is secured in the opening 27. Some of the screws 67 by means of which these angle irons are secured in the shell 26, pass through longitudinal slots 68 in the housing 62. It is thus obvious that the shutter 65 may be slid axially to open or close the passage through the slots 64—67. In Figure 7 the damper 60 is shown with the slotted surface of the housing 62 mounted in the opening 27 and the solid portion 62a of the housing closing the passage 29 on the right side of the damper. Thus the passage 29 is closed on that side in a peripheral direction. The housing 62 may be rotated on its axis after being loosened by releasing the screws 67. In Figure 11 the housing 62 has been rotated through an arc equal to the arcuate width of the solid portion 62a, in a counter-clockwise direction, so that the solid portion 62a now closes the opening 27 between the passage 29 and the interior 48 of the shell 26 or oven, and at the same time the passage 29 is now open through the cut-out 63 and the slots 64 past the damper 60.

As has been stated above, both inlet dampers 47 and 56 cause the inlet air to blow upward into the oven interior 48, the former in a spiral or fan-wise manner and the latter in a thick-sheet-like manner. The substantially cylindrical form of the interior wall 26 of the oven interior 48, will cause the hot air to be deflected and to swirl downward along the sides of this wall, which deflected air will, on meeting the incoming air from the damper, and in conjunction therewith, cause a thorough and complete spreading of the hot air throughout the interior. The cylindrical form of the wall 26 throughout results, in conjunction with the dampers as just mentioned, in the complete elimination of any cool spots or areas in the interior, so that the metal sheets (shown in position in Figure 4 during their transit through the oven) will have the hot air circulated over their entire areas. A common defect of the ovens at present in use, (having a flat bottom instead of cylindrical) is that the hot air inlet is directed upward against one wall of the oven interior and then passes around and down the wall and out at a point adjacent the inlet, with the consequence that the center of the oven interior, or an area near the center, does not receive the complete circulation of hot air, with the result that the sheets 48a come out of the outlet 24 with a portion of their surfaces unbaked.

The annular passage 29 is clear through segments 16, 17, and 18, but since there is an opening 69, similar to the opening 45 of the entrance segment 15, at the top of segment 19, through which opening 69 used air is drawn out of the passage 29 of segments 20aa back to the fan 40, the passage 29 must be closed at that point to prevent the fresh hot air from being sucked out through the opening 69. When the outlet dampers 60 are all in the position shown in Figure 7, their walls 62a obstruct the passage 29 in a peripheral direction. A baffle in the form of a web 70 is mounted in and completely obstructs the passage 29, beginning at the near (left hand, Figure 4) end of the damper 60 in segment 20, extending vertically through the passage 29 along the dividing line between segments 19 and 20, to the right hand (Figures 4 and 18) edge of the square opening 69, then follows the outline on three sides of the opening 69 and continues rearward along the last (forward Figure 19) side 71 of the opening 69 and along the latter side of each opening 69 of all the segments between segment 19 and the mid line 14 of the oven. At the latter place, a ring 72 completely encircles and obstructs the passage 29 between the major oven sections 12 and 13. At the starting point of the baffle 70 (above mentioned), the web 70 is enlarged into a disc 70a which closes off the forward end of the damper 60 in segment 20. A peripheral web 75a on each side of the line 14 blocks the passage 73 at the dividing line between the oven sections 12 and 13. Thus, the baffle 70 provides, in cooperation with the ring 72, a fence whose ends join with the ends of the continuous series of walls 62a of the dampers 60 in the segments 20-22, so that all of the dampers 60 in segments 20-22 may exhaust into one side of their passage 29, and the inlet air is free to pass (from right to left, Figure 4) on the other side of their passages 29.

As stated above, the hot air blown from the combustion chamber 34 enters the passage 29 through the inlet opening 45 in the foremost segment 15. This hot air follows a combined axially rearward and peripherally downward direction in the passage 29. That which reaches the inlet dampers 47 and 56 in segments 16, 17, 18 and 19, passes through the latter and into the interior 48 of these sections. The alternate arrangement of the spiral dampers 47 and the straight dampers 56, ensures a complete intermingling and circulation of the hot gases within their walls 26. The baffle 70 on one side and the series of outlet dampers 60 on the other side, form an enclosure around the openings 69 at the top of the segments 19-22 to exclude the inlet air therefrom. The hot air which as passed through the interior 48 from the segments 16-19, is exhausted out of the passage 29 around the segments 20-22 in the manner described, being sucked by the fan 40 down through the dampers 60, peripherally around the walls 26, out through the openings 69, into the restricted passage 73 between the top of the oven housing 31 and the upper surfaces of the walls 28 of those segments (20-22). At the suction end of the fan 40, the compartment 74 is provided, into which the passage 73 exhausts. When the air is thus returned to the fan 40, which again blows it past the burner 39, starting the cycle over again, a complete circulation of hot air is established which is constantly being renewed and refreshed. Some of the hot air (which has been cooled in transit through the circuit described) is being constantly exhausted through the vent or flue 75 whose degree of opening is controlled by a flue damper 76, so that the quantity of exhaust air into the atmosphere may be varied at will. At the same time fresh air is constantly being taken in through the opening 23 in the forwardmost segment 15. If desired, the two innermost segments on either side of the center line 14, i. e., the ring 72, may be provided with inlet dampers instead of outlet dampers, in which case the baffle 70 would have to be brought down against the innermost end (toward the line 14) of the last nearest outlet damper, instead of extending to the ring 72. With this alternative arrangement and construction (not shown), inlet air could be carried past the exhaust dampers, that is, past segments 19, 20, etc., and into segment 22 and its next forward segment.

Obviously, modifications in form and structure may be made without departing from the spirit and scope of the invention.

I claim:

1. A drying oven comprising a pair of identical half-sections joined axially end to end at their rear ends, each of said sections comprising an elongated housing composed of a plurality of segments joined end to end, said segments each comprising a cylindrical inner shell and a cylindrical outer shell concentric therewith and spaced-apart therefrom to provide an annular passage therebetween, said inner shell having an opening into said passage intermediate a lower quadrant thereof, a combustion chamber open at both ends mounted at a level above said segments at the forward end of said housing, the forward end of said annular passage communicating with the forward end of said combustion chamber, inlet dampers mounted in said openings in the inner shells of the forward group of said segments, outlet dampers mounted in said openings in the inner shells of the rearward group of said segments, a peripheral ring closing said annular passage at the rear end of the last of said segments, a baffle closing the forward end of the forwardmost of said outlet dampers, the rearward end of the rearwardmost of said outlet dampers being closed by said ring, openings in the top of the outer shell of each of said segments having outlet dampers and openings in the top of the outer shell of the rearwardmost of said segments having inlet dampers, a baffle in said annular passage enclosing both of said last-named openings and extending at one end to said closed end of said forwardmost outlet damper and at the other end to said ring, said oven housing providing a compartment between the upper portion of said oven housing and the outer shells of said outlet damper segments above both of said last-named openings, and a fan mounted in the rear end of said combustion chamber, said compartment communicating with the rear side of said fan.

2. A drying oven comprising a pair of identical half-sections joined axially end to end at their rear ends, each of said sections comprising an elongated housing composed of a plurality of segments joined end to end, said segments each comprising a cylindrical inner shell and a cylindrical outer shell concentric therewith and spaced-apart therefrom to provide an annular passage therebetween, said inner shell having an opening into said passage intermediate a lower quadrant thereof, a combustion chamber open at both ends mounted at a level above said segments at the forward end of said housing, the forward end of said annular passage communicating with the forward end of said combustion chamber, inlet dampers mounted in said openings in the inner shells of the forward group of said segments, outlet dampers mounted in said openings in the inner shells of the rearward group of said segments, a peripheral ring closing said annular passage at the rear end of the last of said segments, a baffle closing the forward end of the forwardmost of said outlet dampers, the rearward end of the rearwardmost of said outlet dampers being closed by said ring, openings in the top of the outer shell of each of said segments having outlet dampers and openings in the top of the outer shell of the rearwardmost of said segments having inlet dampers, a baffle in said annular passage enclosing both of said last-named openings and extending at one end to said closed end of said forwardmost outlet damper and at the other end to said ring, said oven housing providing a compartment between the upper portion of said oven housing and the outer shells of said outlet damper segments above both of said last-named openings, and a fan mounted in the rear end of said combustion chamber, said compartment communicating with the rear side of said fan, said combustion chamber comprising a cylinder suspended from the ceiling of said oven housing, a second cylinder concentric with and within said first cylinder at a spaced-apart distance therefrom, and expansible means uniting said cylinders.

3. A drying oven comprising a pair of identical half-sections joined axially end to end at their rear ends, each of said sections comprising an elongated housing composed of a plurality of segments joined end to end, said segments each comprising a cylindrical inner shell and a cylindrical outer shell concentric therewith and spaced-apart therefrom to provide an annular passage therebetween, said inner shell having an opening into said passage intermediate a lower quadrant thereof, a combustion chamber open at both ends mounted at a level above said segments at the forward end of said housing, the forward end of said annular passage communicating with the forward end of said combustion chamber, inlet dampers mounted in said openings in the inner shells of the forward group of said segments, outlet dampers mounted in said openings in the inner shells of the rearward group of said segments, a peripheral ring closing said annular passage at the rear end of the last of said segments, a baffle closing the forward end of the forwardmost of said outlet dampers, the rearward end of the rearwardmost of said outlet dampers being closed by said ring, openings in the top of the outer shell of each of said segments having outlet dampers and openings in the top of the outer shell of the rearwardmost of said segments having inlet dampers, a baffle in said annular passage enclosing both of said last-named openings and extending at one end to said closed end of said forwardmost outlet damper and at the other end to said ring, said oven housing providing a compartment between the upper portion of said oven housing and the outer shells of said outlet damper segments above both of said last-named openings, and a fan mounted in the rear end of said combustion chamber, said compartment communicating with the rear side of said fan, said inlet dampers comprising cylindrical housings having each a slot therein extending from end to end thereof and a shutter adapted to vary the degree of opening of said slot.

4. A drying over comprising a pair of identical half-sections joined axially end to end at their their ends, each of said sections comprising an elongated housing composed of a plurality of segments joined end to end, said segments each comprising a cylindrical inner shell and a cylindrical outer shell concentric therewith and spaced-apart therefrom to provide an annular passage therebetween, said inner shell having an opening into said passage intermediate a lower quadrant thereof, a combustion chamber open at both ends mounted at a level above said segments at the forward end of said housing, the forward end of said annular passage communicating with the forward end of said combustion chamber, inlet dampers mounted in said openings in the inner shells of the forward group of said segments, outlet dampers mounted in said openings in the inner shell of the rearward group of said segments, a peripheral ring closing said annular passage at the rear end of the last of said segments, a baffle closing the forward end of the forwardmost of said outlet dampers, the rearward end of the rearwardmost of said outlet dampers being closed by said ring, openings in the top of the outer shell of each of said segments having outlet dampers and openings in the top of the outer shell of the rearwardmost of said segments having inlet dampers, a baffle in said annular passage enclosing both of said last-named openings and extending at one end to said closed end of said forwardmost outlet damper and at the other end to said ring, said oven housing providing a compartment between the upper portion of said oven housing and the outer shells of said outlet damper segments above both of said last-named openings, and a fan mounted in the rear end of said combustion chamber, said compartment communicating with the rear side of said fan, said inlet dampers comprising cylindrical housings having each a slot therein extending from end to end thereof and a shutter adapted to vary the degree of opening of said slot, some of said slots extending at an acute angle to the axis of the damper housing and some of said slots extending parallel with said axis.

5. A drying oven comprising a pair of identical half-sections joined axially end to end at their rear ends, each of said sections comprising an elongated housing composed of a plurality of segments joined end to end, said segments each comprising a cylindrical inner shell and a cylindrical outer shell concentric therewith and spaced-apart therefrom to provide an annular passage therebetween, said inner shell having an opening into said passage intermediate a lower quadrant thereof, a combustion chamber open at both ends mounted at a level above said segments at the forward end of said housing, the forward end of said annular passage communicating with the forward end of said combustion chamber, removable inlet dampers mounted in said openings in the inner shells of the forward group of said segments, removable outlet dampers mounted in said openings in the inner shells of the rearward group of said segments, a peripheral ring closing said annular passage at the rear end of the last of said segments, a baffle closing the forward end of the forwardmost of said outlet dampers, the rearward end of the rearwardmost of said outlet dampers being closed by said ring, openings in the top of the outer shell of each of said segments having outlet dampers and openings in the top of the outer shell of the rearwardmost of said segments having inlet dampers, a baffle in said annular passage enclosing both of said last-named openings and extending at one end to said closed end of said forwardmost outlet damper and at the other end to said ring, said oven housing providing a compartment between the upper portion of said oven housing and the outer shells of said outlet damper segments above both of said last-named openings, and a fan mounted in the rear end of said combustion chamber, said compartment communicating with the rear side of said fan.

DANIEL MILAN.